April 7, 1931.  W. C. HOOEY  1,799,166
TREATMENT OF ZINC BEARING MATERIAL
Filed Dec. 26, 1928
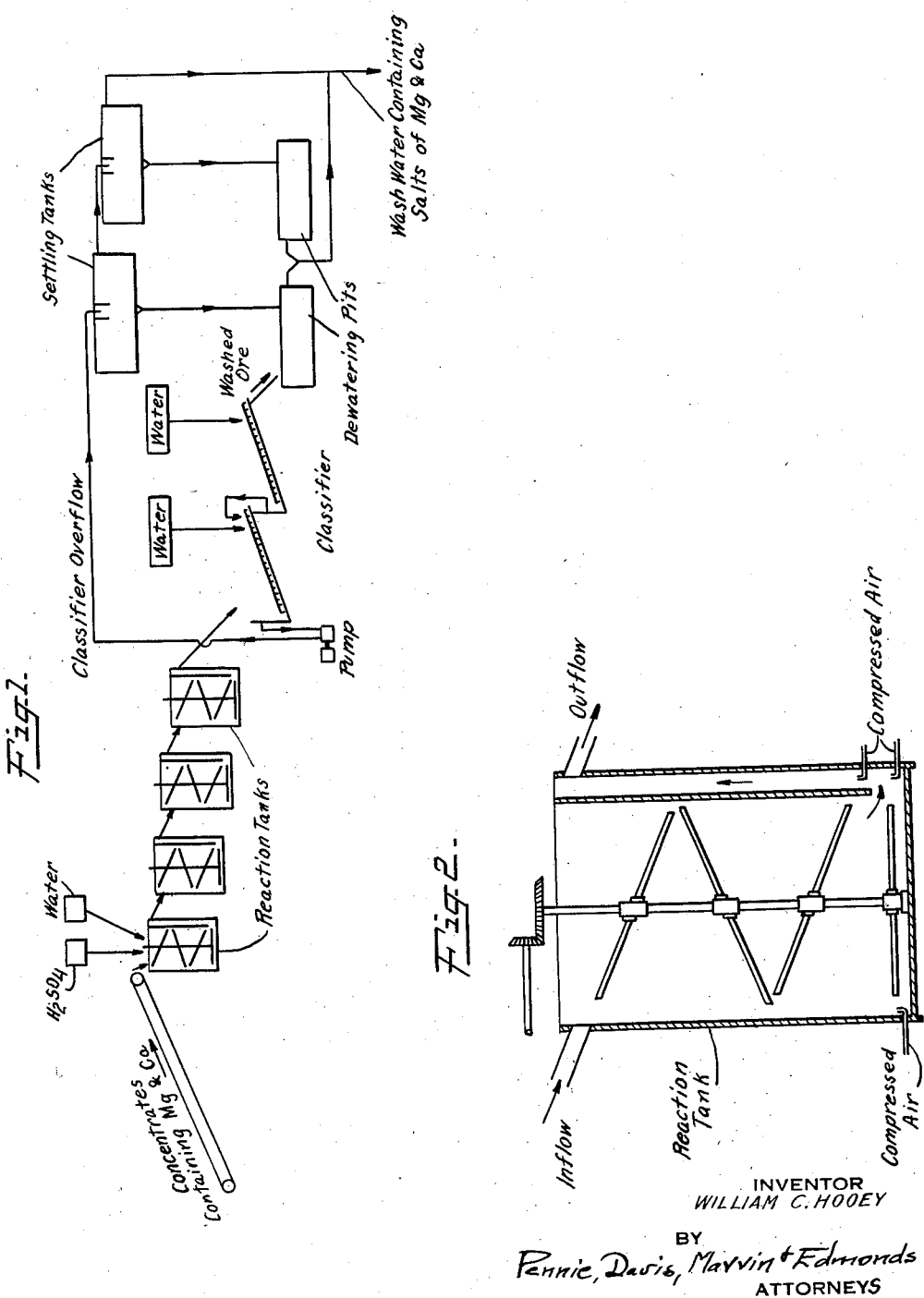
INVENTOR
WILLIAM C. HOOEY
BY
Pennie, Davis, Marvin + Edmonds
ATTORNEYS Patented Apr. 7, 1931

1,799,166

UNITED STATES PATENT OFFICE

WILLIAM C. HOOEY, OF PALMERTON, PENNSYLVANIA, ASSIGNOR TO THE NEW JERSEY ZINC COMPANY, OF NEW YORK, N. Y., A CORPORATION OF NEW JERSEY

TREATMENT OF ZINC-BEARING MATERIAL

Application filed December 26, 1928. Serial No. 328,609.

This invention relates to the treatment of zinc-bearing material, such as ores, concentrates, and the like, and has for its object the provision of improvements in the treatment of zinc-bearing material for the production of a purified product capable of forming relatively pure zinc products, such as zinc metal, zinc dust, zinc oxide, other compounds of zinc, zinc-containing liquors, etc.

Certain zinc-bearing material, such as zinc ores, concentrates and the like, are frequently contaminated with impurities such as compounds of magnesium and/or calcium, etc. When present in appreciable amounts, these impurities prove objectionable in the manufacture of certain zinc products. Such impurities are not readily removable, since they are not water-soluble, and cannot therefore be washed out. They not only deleteriously affect the quality of the finished zinc product, but they also usually exert undesirable influences on the process of working up the zinc products. Magnesium and/or calcium are usually present in the zinc ores or concentrates as carbonates, though they will also sometimes be present in the form of other compounds, such as silicates, aluminates, etc.

In the manufacture of lithopone, for example, which is a calcined coprecipitate of barium sulfate and zinc sulfide obtained by bringing together aqueous solutions of barium sulfide and zinc sulfate, investigation has shown that the presence of as much as one to two parts of magnesium per 1000 parts of zinc in the zinc sulfate liquor exerts a deleterious effect on various steps of the lithopone manufacturing process, as well as on the final lithopone product itself. The injurious effects of the presence of magnesium and the like in the manufacture of lithopone are more fully discussed in the copending application of Messrs. Hooey and Flynn, Serial No. 325,644 filed December 12, 1928.

My investigations have shown that zinc-bearing material containing objectionable impurities in appreciable amounts, such as compounds of magnesium and/or calcium, may be appropriately treated, either in batches or continuously, to remove such impurities in substantial amounts. The purified zinc-bearing material is then in condition to be suitably processed to effect the production of relatively pure zinc products, more particularly as far as magnesium and/or calcium are concerned.

According to the invention, zinc-bearing material contaminated with appreciable amounts of impurities, such as magnesium and/or calcium compounds, etc. is subjected to an appropriate acid treatment to convert the original water-insoluble compounds of magnesium and calcium into compounds of the acid which will render the impurities relatively water-soluble. The water-soluble compounds are then separated from the zinc-bearing material. Such acid compounds as are not readily water-soluble may be removed by leaching and/or hydroseparation. The treatment process contemplated by the invention may be conducted in such manner as to substantially inhibit the formation of water-soluble zinc compounds, at least in appreciable amounts.

In accordance with the practice of the invention, zinc-bearing material contaminated with appreciable amounts of magnesium and/or calcium compounds is subjected, preferably in the form of a pulp, to an appropriate acid treatment in a reaction tank, whereby the impurities are converted into relatively water-soluble compounds that may be separated from the zinc-bearing material. The zinc-bearing material may advantageously consist of zinc ores, such as zinc sulfide ores containing limestone gangue, and preferably ores that have been concentrated. In order that the acid may attack the impurities more readily and completely, it is preferred that the zinc-bearing material be in the form of finely divided particles. Due to the relatively large total surface area exposed to the acid by such finely divided particles of zinc-bearing material, the impurities present in and among the zinc concentrates are particularly amenable to the acid treatment.

The pulp of zinc-bearing material and acid is preferably agitated in order to keep the solids in suspension. This agitation may be obtained by the use of mechanical agitators, augmented by aeration of the pulp. Sulfuric acid is well adapted for this operation, though other acids or mixture of acids may be employed—such, for example, as hydrochloric, etc., as well as such acid gases as sulfur dioxide, sulfur trioxide, etc.

The invention will be better understood by tracing through the practice of the same on representative samples of zinc-bearing material contaminated with both magnesium and calcium compounds. To this end it will also be advantageous to refer to the attached diagrammatic flow sheet of a plant employed in the practice of the invention on unroasted zinc sulfide ore concentrates.

Flotation zinc sulfide ore concentrates, assaying as follows:

|  | Per cent |
|---|---|
| Zn | 54.7 to 57.2 |
| Pb | 3.3 to 5.4 |
| CaO | 1.5 to 1.9 |
| MgO | 1.1 to 1.3 |
| Fe | 3.0 to 6.0 |
| S | 29.7 to 32.0 | and having the following minimum and maximum screen quantities:

|  | Per cent |
|---|---|
| On 48 mesh | 0 to .2 |
| On 65 mesh | 0 to 1.4 |
| On 80 mesh | 0.6 to 4.8 |
| On 100 mesh | 4.0 to 10.8 |
| On 150 mesh | 10.0 to 15.5 |
| On 200 mesh | 20.2 to 21.0 |
| On 300 mesh | 21.1 to 27.4 |
| Through 300 | 27.4 to 37.1 | were continuously fed by means of a belt conveyor from a storage hopper into the first of a series of four wooden reaction tanks (11 feet in depth and 10 feet in diameter) equipped with mechanical agitators and supplemented by compressed air jets. These four tanks are located on successively lower levels. The overflow conduits lead from each higher to the next lower tank.

Water is continuously run into the first reaction tank until a pulp is obtained having a substantially constant ratio of water to ore. In the present preferred practice this ratio is about one part of ore to about one part of water. Other ratios of ore to water may, of course, be employed, but the one just indicated has been found particularly efficacious in the treatment of the class of ore concentrates now being described.

Sulfuric acid equivalent to about 100 pounds of $SO_3$ per ton of moist ore concentrates treated is continuously conducted into the first reaction tank. When magnesium and calcium are present in the ore concentrates as carbonates, the reactions may be indicated in this manner:

(1) 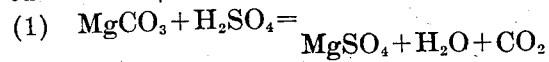
$$MgCO_3 + H_2SO_4 = MgSO_4 + H_2O + CO_2$$

(2) 
$$CaCO_3 + H_2SO_4 = CaSO_4 + H_2O + CO_2$$

The substantially water-insoluble magnesium carbonate is converted by the acid treatment into relatively water-soluble magnesium sulfate. The substantially water-insoluble calcium carbonate is converted into slightly water-soluble calcium sulfate.

The mechanical agitators and compressed air jets serve to keep the pulp mixture in a continuous state of agitation. In order to insure the ready and complete conversion, as indicated in Equations (1) and (2), it is desirable to keep the ore concentrates in continuous suspension throughout the acidulated water vehicle. This is accomplished in large part by the aid of the mechanical agitators and compressed air jets. There is a decided tendency for the concentrates to settle to the bottom of the tank and for some segregation to take place—the heavier and coarser ore particles settling to the bottom. If a layer of compact concentrates collects at the bottom of the tank, it is substantially impossible for the acid to attack the magnesium and calcium carbonates. The mechanical agitators and air jets aid in retarding this settling tendency.

The pulp undergoing treatment in the first reaction tank is transferred to the second reaction tank in order to permit the acid reaction to take place progressively. The transfer is made continuous by flowing the pulp by gravity from the first reaction tank which is placed at a higher level. While pulp from the upper level of the first tank may be directly conducted to the second tank, it is preferable to conduct pulp from the bottom of the first tank, because of the tendency of the coarser ore to settle more rapidly than the finer ore. Since the ore particles tend to settle toward the bottom of the tank, advantage may be taken of this tendency in order to prolong the exposure of the coarser particles to the action of the acid.

In order to lift pulp from the bottom to the top of the tank, an elongated box or conduit device with open ends is placed within the tank and connected with the overflow at its upper end. The lower end of the box or conduit device reaches to near the bottom of the tank. A compressed air jet, or jets, is conducted into the box or conduit device to induce an upward flow or lift of pulp from the bottom to the overflow at the top of the tank.

The overflow from the first reaction tank progressively fills and overflows the successively lower second, third and fourth reaction tanks. Each tank is preferably equipped with mechanical agitators, air jets and air lifts as described above. The reactions (1) and (2) will have gone to substantial completion at the time the pulp leaves the last tank.

The pulp overflow from the last reaction tank is conducted, preferably by gravity, to a classifier where the acid treated zinc concentrates are washed or leached with water. The present preferred practice is to employ a multi-deck, such as a triplex two-stage, classifier for continuous countercurrent washing. As shown in the accompanying diagrammatic flow sheet, the classifier rakes operate at inclined angles. The forward movement of the rakes gradually progresses the concentrates up the inclined bottoms of the classifier, as the pulp water flows down the inclined bottoms. Fresh wash or leach water is introduced into the concentrates at or near the top of the inclined bottoms. As the downwardly flowing water runs countercurrent through and over the rising concentrates, the concentrates are continuously subjected to a washing or leaching action.

The preliminarily washed or leached concentrates are conducted, preferably to a second stage classifier action, where the cleansing operation is repeated. As a result of this classifying action, the concentrates discharged from the top of the last classifier stage are substantially freed of all soluble sulfates of magnesium and calcium. The wash or leach water, containing some fine concentrates and much of the undissolved calcium sulfate particles in suspension leaving the classifier, is conducted to settling tanks. In the present practice of the invention this classifier overflow water is pumped to a series of connecting settling tanks placed at successively lower levels, above dewatering pits provided for the collection of the washed or leached concentrates leaving the classifier, so that the overflow from the first settling tank may flow by gravity to the second settling tank.

The fine concentrates and undissolved calcium sulfate particles settle to the bottom of the settling tanks from which they are continuously underflowed by gravity to the dewatering pits located below. The water, containing the sulfates of magnesium and calcium in solution, as well as some of the calcium sulfate particles in suspension, overflows the last settling tank and is permitted to go to waste.

The washed or leached ore concentrates discharged from the settling tanks to the dewatering pits are allowed to settle to the bottom as a sludge, and the water is overflowed. The overflow water is substantially free of all concentrate particles, but may contain relatively small amounts of the sulfates of magnesium and calcium in solution, as well as some of the calcium sulfate particles in suspension. This water is permitted to go to waste, since it does not contain sufficient valuable constituents to warrant reworking for the recovery of the same. The partially dewatered and purified concentrates are removed from the pits, usually with a crane, and loaded into cars. They are in condition to be suitably processed for the manufacture of relatively pure zinc products.

The concentrates produced by the practice of the invention on the specific zinc-bearing material above set out, show approximately the following analysis:

|  | Per cent |
|---|---|
| Zn | 55 to 60 |
| CaO | .03 to 1.9 |
| Mgo | .06 to .17 |

If the presence of calcium sulfate in the ore concentrates is not objectionable, at least in the amount present in the sludge delivered to the dewatering pits, no extra precaution need be taken to remove the calcium sulfate particles. In that event the concentrate and calcium sulfate particles are allowed to settle to the bottom of the pits, and the excess water is overflowed from the top. The solids will, however, be substantially free of magnesium. In the manufacture of some zinc products the presence of calcium sulfate in the zinc-bearing material may not be objectionable.

On the other hand, if it is desired to obtain a final zinc-bearing material that is substantially free of calcium, as well as of magnesium, the sludge of ore concentrates and calcium sulfate delivered to the dewatering pits may be subjected to a hydroseparation action. Thus, the sludge may be suitably agitated in the presence of water in such manner that the purified concentrates settle to the bottom of the container, while the calcium sulfate particles remain in suspension in the upper water level. This result is possible, due to the fact that the concentrate particles tend to settle more easily and readily than do the calcium sulfate particles. The water and its suspended calcium sulfate particles are separated from the concentrate particles. The greater part of the calcium sulfate goes with the finer concentrates to the settling tanks and in practice it is preferable to either subject the underflow from the settling tank to hydroseparation or to operate the settling tanks as hydroseparators.

The efficiency of the treatment process contemplated by the invention is somewhat dependent upon the nature of the zinc bearing material, its physical and chemical characteristics. Thus, in the case of zinc ores, it is, of course, desirable that the ores be concentrated so that as much of the gangue constituents as possible be removed prior to the acid treatment. Moreover, fine particle sized material is more readily and completely attacked by the acid, due to the enormous surface area offered by the total number of fine particles to the acid.

In treating flotation concentrates in which reagents used in flotation are still present, a froth or scum is usually formed during the agitation and aeration of the pulp in the reaction tanks, which persists in accompanying the concentrates until they are finally deposited in the dewatering pits. Since this froth or scum does not break down readily, the dewatering operation is slowed-up. Suitable launders may be attached to the reaction tanks with which to conduct away the froth or scum.

The size and number of tanks required in the series of reaction tanks is determined by various factors, such as by the tonnage of ore to be treated per hour and the time required for the reaction to take place. The time required for the acid reaction varies with such factors as ratio of water to ore, the physical and chemical characteristics of the zinc-bearing material, the particle size of the material, the quantity and nature of the compounds of magnesium and calcium, as well as that of other materials present in the zinc-bearing material that may consume the acid, and the concentration of the acid, as well as whether or not an excess of acid is employed. Laboratory experiments have shown the water-ore ratios varying from 8 to 1 and 1 to 2 result in satisfactory completion of the reaction in from 1 to 4 hours. In the plant practice herein more particularly described, 75 tons of concentrates have been satisfactorily treated per 24 hours, using approximately a 1—1 ratio of water to ore. The time required from the reaction to go to completion is about 22 hours, varying as the above tonnage is increased or decreased.

While the present preferred practice of the invention is to add the acid to the first reaction tank, it is quite practical and in some cases preferable to distribute the acid additions to two or more or all of the reaction tanks. This is particularly true when the quantity of acid required to effect the removal of magnesium and calcium might, if added entirely to the first reaction tank, result in the solution and excessive loss of zinc. It is, of course, desired to render the contaminants magnesium and calcium acid and water-soluble, while at the same time inhibiting any reaction with the zinc. In any case, the reaction of the acid with the magnesium and calcium compounds continuous throughout the series of reaction tanks, and is substantially complete when the zinc-bearing material leaves the last tank.

The sulfuric acid addition to the first reaction tank is controlled in part by testing the pulp in the various reaction tanks with Congo paper, which turns blue when acid is present. This test may be improved by withdrawing suitable test portions of the pulp and filtering the same. The solids are discarded and the filtrate portion is titrated with a standard alkali solution to measure the quantity of acid present in the filtrate. In the present preferred practice of the invention, an excess of acid is maintained in all of the reaction tanks. This excess acid is subsequently removed during the washing and leaching operations.

A further check is made on the zinc concentrates discharged from the classifier, that is after they have been subjected to a washing or leaching action with water. This test is made as follows: A sample of 1200 grams wet weight (approximately 33% $H_2O$) of the washed or leached concentrates is mixed with 100 cc. of water and 5 cc. of 1.84 specific gravity sulfuric acid. After agitating this mixture for about a minute, a portion of the slurry is removed, filtered and the filtrate titrated with a standard alkali for a measure of acidity. The main sample mixture is further agitated for about one hour and then another portion of the slurry is removed, filtered and the filtrate titrated for acidity. The quantity of acid consumed during this test may be calculated to the equivalent magnesium or calcium, the assumption being that the acid reacts with the compounds of these metals rather than with that of the zinc, and is thus a measure of the completion of the reaction. This test has been found very useful because the usual analytical determinations for magnesium and calcium require considerable time. Such quantitative analytical determinations are, however, made regularly as a final check of the operation.

It has been pointed out above that while some of the calcium sulfate resulting from the sulfuric acid treatment of the zinc concentrates is soluble in water, which may be decanted, a relatively large amount of the calcium sulfate remains in suspension. The solubility of calcium sulfate in water may be availed of by subjecting the partially purified concentrates and calcium sulfate particles to repeated washing or leaching with water. This, however, may be undesirable for the reason that an excessively large amount of water may be necessary, not to mention the inconvenience of subjecting the mixture of zinc concentrates and calcium sulfate particles to such repeated washings. As pointed out above, a pulp of the zinc concentrates and calcium sulfate particles in suspension may be agitated in such manner as to effect the separation of the calcium sulfate particles from the zinc concentrate particles by a hydroseparation action. The analytical data given below are the result of a laboratory test on 1500 grams of zinc ore and calcium sulfate particles conducted to illustrate the method of removing the calcium sulfate particles by hydroseparation.

|  | Original ore | Ore after treatment with $H_2SO_4$ and water washing | Hydroseparation test | |
|---|---|---|---|---|
|  |  |  | Underflow | Overflow |
| Per cent Zn | 51.5 | 53.4 | 56.7 | 6.4 |
| Pb | 2.5 | 2.8 | 3.0 | 2.7 |
| Fe | 4.8 | 5.0 | 5.1 | 0.7 |
| Cd | .16 | .14 | .13 | 0.03 |
| MgO | | .08 | .07 | .07 |
| CaO | 2.1 | 2.1 | None | 32.0 |
| Weight of zinc | 2.9 | | | |
|  | 275.5 grams | 254.7 | 252.6 | 2.2 |

An analysis of this data shows that whereas the original ore contained 2.9% calcium computed as calcium oxide (CaO), the underflow of purified ore in the hydroseparation test evidenced no calcium whatever. The overflow water from the hydroseparation test, however, shows the presence of as much as 32% calcium calculated as calcium oxide.

Various methods may obviously be pursued in the practice of the invention. For example, instead of suspending the zinc concentrates throughout a liquid body, the concentrates may be allowed to rest in the form of a bed on a perforated floor. Acidulated water may then be percolated up through the bed of concentrates, in this manner effecting the formation of calcium and magnesium compounds of the acid.

The practice of the invention makes zinc-bearing material contaminated with magnesium and calcium compounds available for the production of relatively pure zinc products that would otherwise be discarded, or which would at best have to be treated in some other manner. According to the practice above outlined, such zinc-bearing material may now be quite readily purified.

I claim:

1. The method of treating zinc-bearing material in the form of zinc concentrates contaminated with water-insoluble compounds of magnesium and calcium in objectionable amounts which comprises subjecting a pulp of the material to the action of sulfuric acid in amount adapted to convert the original compounds of magnesium and calcium to magnesium and calcium sulfate while substantially inhibiting the formation of zinc sulfate, leaching the so-treated material to remove such sulfates as have been rendered water-soluble by the acid treatment, and subjecting the resulting sludge of solids to a hydroseparation action to effect the removal of undissolved calcium sulfate particles held in suspension.

2. The method of treating zinc-bearing material in the form of zinc concentrates contaminated with water-insoluble compounds of magnesium and calcium in objectionable amounts which comprises continuously conducting the zinc-bearing material and water and sulfuric acid in appropriate proportions into the first of a series of reaction tanks, said reaction tanks being placed at successively lower levels and being so connected that the overflow from one tank may be conducted by gravity into the next succeeding tank in the series, continuously agitating the pulp in each tank to keep the solids in suspension during which the original compounds of magnesium and calcium are converted to magnesium and calcium sulfates while inhibiting the formation of appreciable amounts of zinc sulfate, and continuously leaching the so-treated material to remove the magnesium and calcium sulfates.

3. The method of treating zinc-bearing material in the form of zinc concentrates contaminated with water-insoluble compounds of magnesium and calcium in objectionable amounts which comprises continuously conducting the zinc-bearing material and water and sulfuric acid in appropriate proportions into the first of a series of reaction tanks, said reaction tanks being placed at successively lower levels and being so connected that the overflow from one tank may be conducted by gravity into the next succeeding tank in the series, continuously agitating the pulp in each tank to keep the solids in suspension during which the original compounds of magnesium and calcium are converted to magnesium and calcium sulfates while inhibiting the formation of appreciable amounts of zinc sulfate, overflowing pulp from each tank that comes directly from near the bottom of said tank, and continuously leaching the so-treated material to remove the magnesium and calcium sulfate.

4. The method of treating zinc-bearing material in the form of unroasted zinc sulphide ore concentrates contaminated with water-insoluble compounds of magnesium and calcium in objectionable amounts, which comprises subjecting a pulp of the zinc sulphide concentrates to the action of sulphuric acid in amount adapted to convert the original compounds of magnesium and calcium to magnesium and calcium sulphates while substantially inhibiting the conversion of zinc sulphide to zinc sulphate, leaching the so treated material to remove sulphates that have been formed by the acid treatment, and subjecting the resulting sludge of solids to a hydroseparation action to effect the removal of undissolved calcium sulphate particles held in suspension.

In testimony whereof I affix my signature.

WILLIAM C. HOOEY.